United States Patent [19]

Daughtry

[11] 3,851,986
[45] Dec. 3, 1974

[54] UTILITY INSTRUMENT

[76] Inventor: Albert E. Daughtry, 700 Wilkes Dr., Eugene, Oreg. 97402

[22] Filed: Sept. 29, 1972

[21] Appl. No.: 293,563

[52] U.S. Cl............ 403/373, 30/125, 30/156
[51] Int. Cl............................. A01b 1/22
[58] Field of Search ......... 30/156, 339, 125, 155; 403/4, 373

[56] References Cited
UNITED STATES PATENTS

| | | | |
|---|---|---|---|
| 2,265,775 | 12/1941 | McNamara | 30/156 |
| 2,305,465 | 12/1942 | Bangser | 30/339 X |
| 2,681,505 | 6/1954 | Flanagan | 30/125 |
| 3,509,627 | 5/1970 | Gilbert et al. | 30/125 |
| 3,621,899 | 11/1971 | Hula | 30/339 X |

Primary Examiner—James R. Boler
Assistant Examiner—Peter Nerbun
Attorney, Agent, or Firm—Eugene M. Eckelman

[57] ABSTRACT

An instrument having a lock member arranged to hold an implement on a handle in an operating position and also arranged to allow the implement to be swung into the handle in an inoperative position. The lock member has an intermediate position providing for detachment of the implement from the handle by moving the implement laterally relative to the handle. The implement is arranged to be supported in more than one angular position with relation to the handle. The handle is constructed of a main body portion and top and bottom plates, the body portion having one or more compartments for holding a compass or supplies. The top plate has a waterproof connection on the handle.

4 Claims, 7 Drawing Figures

PATENTED DEC 3 1974                   3,851,986

[3,851,986]

UTILITY INSTRUMENT

BACKGROUND OF THE INVENTION

This invention relates to new and useful improvements in a utility instrument.

In the joint invention of a utility handle of Lloyd F. Dowdy and myself, covered in U.S. Pat. No. 2,904,373, the handle is associated with an implement, such as a knife blade, detachable therefrom. The implement could be swung from an operative position projecting from the handle to an inoperative position disposed within a slot in the handle. The connection between the implement and the handle was such that the implement when open was not completely stable with the handle and furthermore the implement when being moved to its inoperative position would not rotate freely and also would not seat itself without a second effort being employed on the part of the user to guide it into place.

SUMMARY OF THE INVENTION

According to the present invention and forming a primary objective thereof, a utility instrument is provided which allows free and accurate rotation of an implement portion thereof between operative and inoperative positions on a supporting handle and when the implement is disposed in an operative position, it is held securely in stable condition. This structure has a novel locking member and a novel arrangement of openings in the implement and handle which provides the stable positioning of the implement in a use position which also provides the precise and free movement of the implement when desired between its two positions.

Another object of the present invention is to provide a novel handle structure employing compartment means in the handle with a watertight cover and watertight fastening means for the cover.

The invention will be better understood and additional objects and advantages will become apparent from the following description taken in connection with the accompanying drawings which illustrate a preferred form of the device.

DETAILED DESCRIPTION OF A PREFERRED EMBODIMENT

Figure 4:
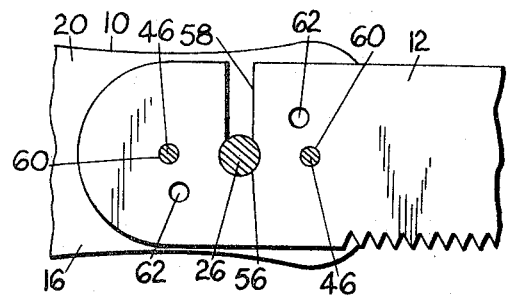
FIG. 4 is a fragmentary section view, also slightly enlarged and taken on the line 4—4 of FIG. 2.

Referring in particular to the drawings, the numeral 10 designates the handle of the invention and the numeral 12 designates one form of implement which may be used with the handle. The implement in FIG. 1 comprises a knife blade but if desired other forms of implements such as a saw blade, as illustrated in FIG. 4, may be used.

Figure 7:
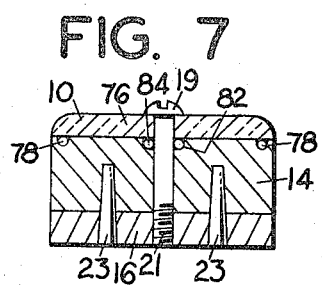
FIG. 7 is a sectional view taken on the line 7—7 of FIG. 3.

The handle 10 includes a body portion 14 and a bottom plate 16. The rearward end of the body portion 14 has a downward extension 18 to which the bottom plate 16 is secured, providing an elongated slot 20 between the body portion 14 and plate 16 which is adapted to receive the implement. The implement 12 is sufficiently thin to be movable in the slot 20 between folded and unfolded positions. Preferably, the downward extension 18 at the rear of the handle has forwardly disposed angled surfaces 22 which define one end of the slot 20 against which a tip end of the knife may abut in its folded or inoperative position, as will be more apparent hereinafter. Securement of the plate 16 to body portion 14 is accomplished by a screw 19 passing through the body portion and having threaded engagement in a tapped bore 21 in plate 16. Longitudinal alignment of plate 16 on the body portion is accomplished by locator pins 23 one on each side of screw 19, FIGS. 3 and 7, fitting in suitable apertures in portions 14 and 16. These pins and apertures preferably are tapered to provide a good fit.

Figure 1:
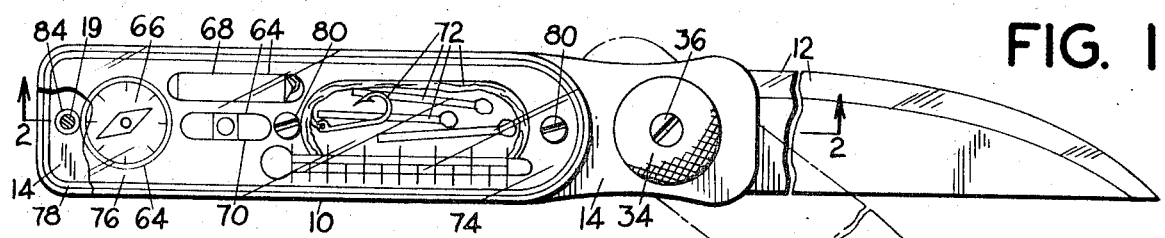
FIG. 1 is a plan view of the present combination handle and detachable implement.
Figure 2:
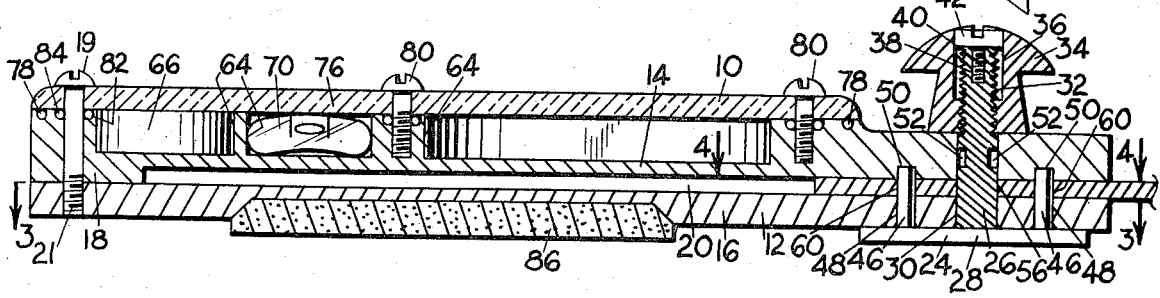
FIG. 2 is a fragmentary longitudinal sectional view taken on the line 2—2 of FIG. 1.
Figure 3:
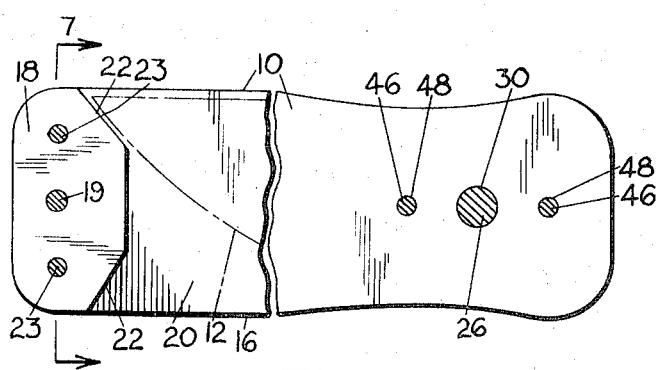
FIG. 3 is a foreshortened sectional view of the instrument slightly enlarged and taken on the line 3—3 of of FIG. 2.
Figure 5:
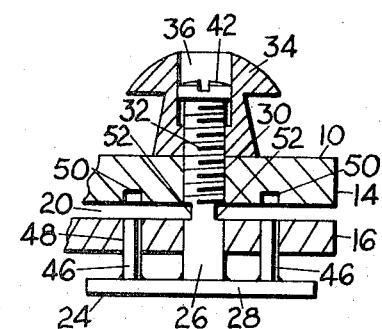

In addition to the implement 12 being rotatable between unfolded position, as shown in FIG. 1, or a folded position disposed in the slot 20 with the tip end abutted against angled surfaces 22, as shown in phantom lines in FIG. 3, it is also detachable from the handle. To accomplish these functions, a locking member 24 is utilized, FIGS. 2, 5 and 6. This locking member has a central post 26 secured to a cross head 28. The post 26 projects freely through apertures 30 in both the handle portions 14 and 16. The upper end of post 26 has external screw threads 32 threadedly engaged by lock nut 34. Lock nut 34 has a counterbore 36 which opens through its upper end and which is of larger diameter than the threaded end 32 of the post 26. An axial tapped bore 38 leads inwardly from the end of the post and receives a screw 40. The post 26 has a head 42 of a diameter greater than the post so as to serve as a limit or stop for backing off rotation of the lock member 34 by engagement with the bottom of counterbore 36.

Locking member 24 also has a pair of aligning pins 46 integral with the cross head 28 and movable freely through a pair of apertures 48 in the handle portion 16. These pins are of a sufficient length to project into a pair of recesses 50 on the inner side of handle portion 14 when the cross head 24 is abutted against the handle portion 16.

Post 26 has side notches 52, and the bottom of these notches is approximately in the longitudinal plane of the top edges of aligning pins 46.

Implement 12 has a pivot aperture 56, FIGS. 2 and 4, adjacent to its rearward end. It also has a laterally extending slot 58 leading from aperture 56 to a longitudinal edge of the implement, the width of such slot being less than the diameter of the pivot aperture 56 and also less than the diameter of the post. More particularly, the pivot aperture 56 is of a diameter to receive the post 26 and allow rotation of the implement on the post, but to install the implement on the post the slotted portion 58 thereof must be aligned with the notched portions 52 in the post and then moved inward in a lateral direction. A pair of apertures 60 are provided in the implement one on each side of pivot aperture 56, and another pair of apertures 62 are similarly provided but rotated around from the apertures 60 for a purpose to be described, the said apertures 60 and 62 being spaced for receiving the aligning pins 46 of the locking member 24.

In mounting the implement 12 on the handle, the lock nut 34 is backed off a selected amount to allow the post 26 and its integral parts to drop to the position wherein the notches 52 are aligned with the slot 20. In this position of the locking member, shown in FIG. 5, the ends of pins 46 are just below the inner surface of handle portion 16. The implement can then be moved laterally inwardly with the slotted portion 58 of the implement 12 being engaged with the notched portion 52 of the post. After the implement is in place, the locking member 24 is pushed manually upwardly to the FIG. 2 position and the nut tightened as shown in such figure. The implement is thus secured non-rotatably on the handle. When it is desired to remove the implement from the handle, the locking member 24 is again positioned as in FIG. 5 by backing off the locking nut a selected amount, and the blade then moved laterally out the side.

The implement may be inserted or removed either by backing lock nut 34 off the selected amount as just described or by completely backing such locking nut off and then manually positioning the locking member 24 to allow engagement or disengagement of the implement in notches 52. It is evident that the implement may be mounted on the handle from either side.

Figure 6:
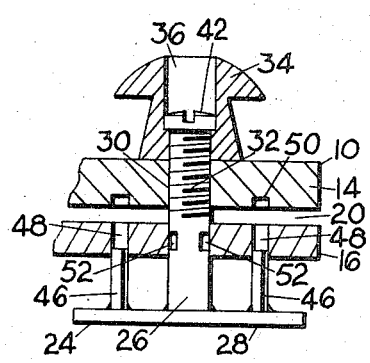
FIGS. 5 and 6 are fragmentary sectional views taken on a line similar to FIG..2 but showing different operative positions of the locking member.

To rotate the implement 12 between its unfolded position projecting outwardly from the handle and its folded position disposed in the slot 20 of the handle, or vice versa, the lock nut 34 is backed off completely to allow the locking member 24 to be withdrawn to the FIG. 6 position. In this withdrawn position, the aligning pins 46 are out of the plane of the slot 20 and the implement 12 can rotate freely on the post 26. In the projecting or use position of the implement 12, the aligning pins 46 engage in the apertures 60 and in the folded or inoperative position of the implement 12, the aligning pins likewise engage in the apertures 60 but in opposite ones thereof. After the implement is rotated to its desired position, the locking member 24 is pushed inwardly to lock the implement in place and then the lock nut 34 tightened, FIG. 2.

The implement can be positioned in an oblique position relative to the handle by engaging aligning pins 46 in the apertures 62 rather than in apertures 60. Such positioning is illustrated in phantom lines in FIG. 1. When a saw blade is used as the implement, it preferably is used in the oblique position as shown in such phantom lines.

The present connection between the implement and the handle provides an efficient connection, namely, one which provides good stability of the blade on the handle and one which allows smooth movement of the implement to its different positions. The aperture 56 need only be slightly greater than the diameter of the post 26 and the apertures 60 need only be slightly greater in diameter than the aligning pins 46, thus providing a firm three point connection of the implement on the handle. Another feature is that when the lock nut is backed all the way off for the purpose of rotating the implement between its positions, such implement rotates freely and uninterrupted on the post 26, and with the locking member 24 clear down as seen in FIG. 6, the notches 52 are below the slot 20 and the implement 12 cannot accidentally fall from the handle during rotation. Also, the rotation of the implement provided between the post 26 and the aperture 30 causes the implement to swing precisely into place in the handle when folded.

The handle portion 14 is provided with a plurality of compartments 64 which may contain various articles such as a compass 66, a candle 68, a level 70, loose articles 72 such as matches and the like, and the thermometer 74. It is desired that these compartments be watertight, and for this purpose a cover 76 is provided which is preferably transparent and which has a watertight connection around the edges by means of a gasket 78 seated in a suitable groove in the side surface of the handle portion 14. The cover 76 is removably held in place by a pair of forward screws 80 and rearward screw 19. The screws 80 are threadedly engaged in portion 14 and these screws as well as screw 19 pass through recesses 82 in such portion which contain O-ring gaskets 84. The arrangement is such that the gaskets 84 provide a watertight seal at the screw fastenings. Another feature of the O-ring gaskets 84 is that the opening therethrough is intentionally smaller than the diameter of the screw shank so that when the screws are backed off from their threaded engagement with the portion 14 to remove the cover 76, the gaskets will hang on the screws and keep them attached to knife portion 14, thus eliminating the possibility of the screws getting lost.

A whetstone 86 is secured to the outer side of bottom handle portion 16.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A utility instrument comprising
   a. a handle having forward and rearward ends,
   b. said handle including a longitudinal edge slot therein forming a pair of handle portions,
   c. said handle portions each having a first aperture therethrough adjacent to the forward end of the handle with the said apertures being in axial alignment,
   d. one of said handle portions also having a pair of second apertures therethrough one of which is disposed on one side of said first aperture and the other of which is disposed on the other side of said aperture,
   e. an implement having forward and rearward ends and including a relatively flat shank portion arranged to be received in said slot,
   f. said shank adjacent to its rearward end having a substantially circular pivot aperture and a pair of aligning apertures one on each side of the pivot aperture,
   g. said shank also having a transverse slot extending from its pivot aperture to a side edge of the shank,
   h. the width of said transverse slot being less than the diameter of said pivot aperture,
   i. a lock member having a cross head,
   j. a pivot post on said cross head extending through said first aperture in the handle portions and through the pivot aperture in said shank, k. the diameter of said pivot post being less than said pivot aperture but greater than the width of said transverse slot, l. means defining a reduced diameter portion on said post intermediate the ends thereof of less dimension than the width of said slot, m. a pair of aligning pins on said cross head one on each side of said pivot post and extending through said second apertures in the one handle portion and arranged to extend through said aligning apertures in said shank to hold said implement in substantial longitudinal alignment with the handle, n. and releasable means on the opposite end of said pivot post from said cross head, o. said releasable means being operative on said post to provide axial movement of the latter to three positions in the first of which the post and aligning pins are pulled in tightly to position the aligning pins in said second apertures and aligning apertures to hold the implement in a secured position, in the second of which the post and aligning pins are released to a position such that the latter are withdrawn from said aligning apertures and said reduced diameter portion is out of alignment with the slot in the handle to permit the implement to pivot between an extended position and a stored position in said slot in the handle and vice versa, and in the third of which the post and aligning pins are released to an intermediate position such that the latter are withdrawn from said aligning apertures and said reduced diameter portion of said post is in alignment with the slot in the handle whereby said shank portion can be detached from the handle by moving it laterally with the said reduced diameter portion of said post moving through said transverse slot.

2. The utility instrument of claim 1 including a second pair of said aligning apertures positioned around said pivot aperture from said first mentioned pair of aligning apertures to position said shank obliquely from said handle.

3. The utility instrument of claim 1 wherein one handle portion has at least one recess therein, a cover on said handle covering said recess, screw means fastening said cover to said handle portion, and washer-like gasket means under said cover receiving said screws to form a watertight connection, said gasket means having a friction fit on said screws so as to remain thereon when the screws are released from said handle portion for removing the cover.

4. The utility instrument of claim 1 wherein said handle portions comprise a body portion and a bottom portion as separate pieces secured together by a screw, locator pins engageable between said body portion and said bottom portion on opposite sides of said screw to hold said handle portions in longitudinal alignment, and a cover portion secured on said body portion on the opposite side from said bottom portion.

* * * * *